US011934458B2

(12) United States Patent
Ji et al.

(10) Patent No.: US 11,934,458 B2
(45) Date of Patent: Mar. 19, 2024

(54) BINARY CODE SIMILARITY DETECTION SYSTEM

(71) Applicant: The George Washington University, Washington, DC (US)

(72) Inventors: Yuede Ji, Washington, DC (US); Hao Howie Huang, McLean, VA (US)

(73) Assignee: The George Washington University, Washington, DC (US)

( * ) Notice: Subject to any disclaimer, the term of this patent is extended or adjusted under 35 U.S.C. 154(b) by 46 days.

(21) Appl. No.: 17/327,351

(22) Filed: May 21, 2021

(65) Prior Publication Data

US 2022/0244953 A1 Aug. 4, 2022

Related U.S. Application Data

(60) Provisional application No. 63/028,700, filed on May 22, 2020.

(51) Int. Cl.
*G06F 16/901* (2019.01)
*G06F 8/41* (2018.01)
(Continued)

(52) U.S. Cl.
CPC ............ *G06F 16/9024* (2019.01); *G06F 8/41* (2013.01); *G06F 8/751* (2013.01); *G06F 21/563* (2013.01); *G06N 3/084* (2013.01)

(58) Field of Classification Search
CPC ........ G06F 8/41; G06F 8/751; G06F 16/9024; G06F 21/56; G06N 3/084
See application file for complete search history.

(56) References Cited

U.S. PATENT DOCUMENTS

2021/0279338 A1 9/2021 Bowman et al.

FOREIGN PATENT DOCUMENTS

CN 110990020 A * 4/2020 ............. G06F 8/427
WO WO-2017197519 A1 * 11/2017 ......... G06F 16/9024

OTHER PUBLICATIONS

Yikun Hu et al, "Binary Code Clone Detection across Architectures and Compiling Configurations", [Online], pp. 88-98, [Retrieved from Internet on Oct. 19, 2022], <https://ieeexplore.ieee.org/stamp/stamp.jsp?arnumber=7961507> (Year: 2017).*

(Continued)

*Primary Examiner* — Ziaul A Chowdhury
(74) *Attorney, Agent, or Firm* — Blank Rome LLP

(57) ABSTRACT

A binary code similarity detection system that compares a target binary code to a source code by comparing the target binary code to a comparing binary generated by compiling the source code. Rather than using a comparing binary generated using a random or fixed compiling configuration, the system identifies the compiling configuration of the target binary code and compares the target binary code to a comparing binary generated using the same compiling configuration as the target binary code. The compiling configuration of the target binary code may be identified by a neural network (e.g., a graph attention network trained on attributed function call graphs of binary codes with known compiling configurations). The target binary code and the comparing binary may be compared using a graph neural network (e.g., a graph triplet loss network) that compares attributed control flow graphs of the of the target binary code and the comparing binary.

18 Claims, 9 Drawing Sheets

(51) Int. Cl.
G06F 8/75 (2018.01)
G06F 21/56 (2013.01)
G06N 3/084 (2023.01)

(56) References Cited

OTHER PUBLICATIONS

Yikun Hu et al. "Cross-Architecture Binary Semantics Understanding via Similar Code Comparison", [Online], pp. 57-67, [Retrieved from Internet on Nov. 21, 2022], <https://ieeexplore.ieee.org/stamp/stamp.jsp?tp=&arnumber=7476630>, (Year: 2016).*
17327351_2023-11-02_WO_2017197519_A1_M.pdf Lie et al., "System and Method For Determing Corespondence And Accountability Between Binary Code And Source Code" [English Translation], (Year: 2017).*
Feng, Qian et al. "Scalable Graph-based Bug Search for Firmware Images." Proceedings of the 2016 ACM SIGSAC Conference on Computer and Communications Security. Oct. 24-28, 2016, Vienna, Austria. pp. 480-491. DOI:http://dx.doe.org/10.1145/2976749.2978370.
Xu, Xiaojun et al. "Neural Network-based Graph Embedding for Cross-Platform Binary Code Similarity Detection." Proceedings of the CCS 2017, Oct. 30-Nov. 3, 2017, Dallas, TX. pp. 1-14. http://dx.doi.org/10.1145/3133956.3134018.

* cited by examiner

```
 1  int square_sum(int a)
 2  {
 3      int result = 0;
 4      int i;
 5      for(i=1; i<a; ++i)
 6      {
 7          result += i * i;
 8      }
 9      return result;
10  }
```
FIG. 1A
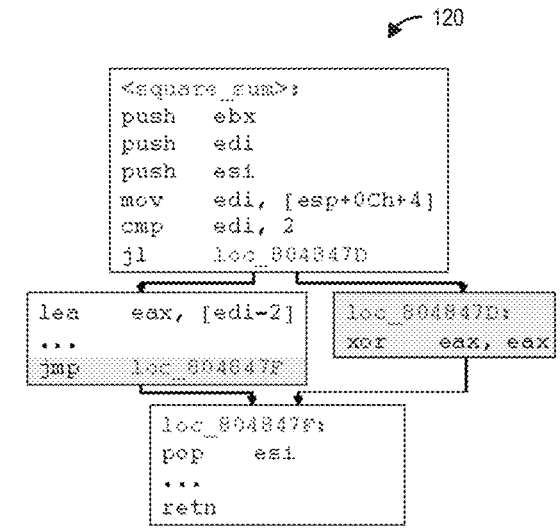
FIG. 1B
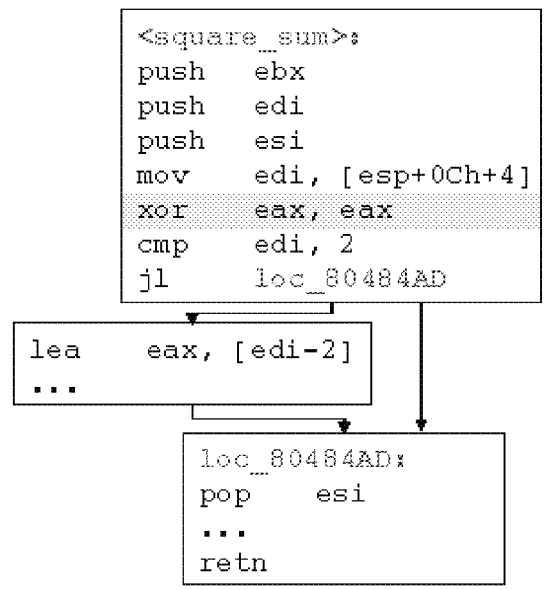
FIG. 1C
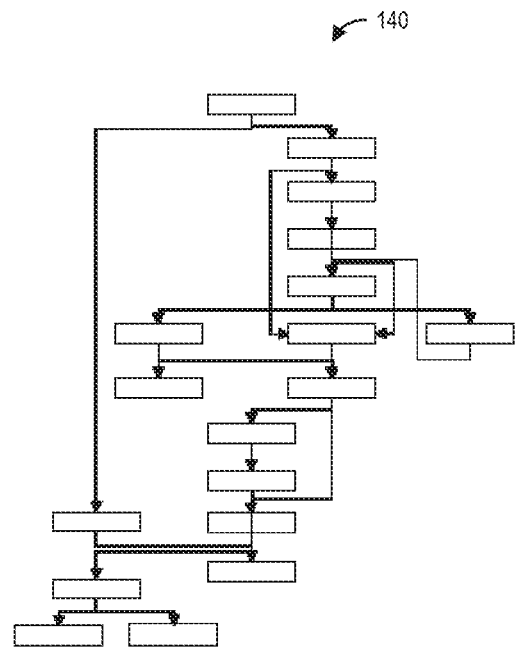
FIG. 1D

```
                                                    ← 210
1  static void do_free_upto(BIO *f,
       BIO *upto) {
2      if (upto) {
3          BIO *tbio;
4          do {
5              tbio = BIO_pop(f);
6              BIO_free(f);
7              f = tbio;
8          }
9          while (f != upto)
10     } else
11         BIO_free_all(f);
12 }
```

FIG. 2A

```
                                                    ← 220
1  static void do_free_upto(BIO *f,
       BIO *upto) {
2      if (upto) {
3          BIO *tbio;
4          do {
5              tbio = BIO_pop(f);
6              BIO_free(f);
7              f = tbio;
8          }
9          while (f != upto)
10     } else
11         // free BIO *f
12         BIO_free_all(f);
13 }
```

FIG. 2B

```
                                                    ← 230
1  static void do_free_upto(BIO *f,
       BIO *upto) {
2      if (upto) {
3          BIO *temp_bio;
4          do {
5              temp_bio = BIO_pop(f);
6              BIO_free(f);
7              f = temp_bio;
8          }
9          while (f != upto)
10     } else
11         BIO_free_all(f);
12 }
```

FIG. 2C

```
                                                    ← 240
1  static void do_free_upto(BIO *f,
       BIO *upto) {
2      if (upto) {
3          BIO *tbio;
4          do {
5              tbio = BIO_pop(f);
6              if (tbio == NULL)
7                  continue;
8              BIO_free(f);
9              f = tbio;
10         }
11         while (f != upto)
12     } else
13         BIO_free_all(f);
14 }
```

FIG. 2D

```
1  ...
2  do {
3       tbio = BIO_pop(f);
4       BIO_free(f);
5       f = tbio;
6  } while (f != upto)
7  ...
```

FIG. 4A

```
loc_81A85B6:
mov    eax, [esp+2Ch+arg_0]
mov    [esp+2Ch+var_2C], eax
call   BIO_pop
mov    [esp+2Ch+var_10], eax
...
```

FIG. 4B

```
loc_816C6F2:
mov    [esp+1Ch+var_1C], ebx
call   BIO_pop
mov    [esp+1Ch+var_1C], ebx
...

loc_816C6F0:
...
```

FIG. 4C

```
loc_824A343:
mov    eax, [esp+1Ch+arg_0]
mov    [esp+1Ch+var_1C], eax
call   BIO_pop
mov    [esp+1Ch+var_1C], eax
...
```

FIG. 4D

```
                                    ┌─ 610                              ┌─ 620
┌─────────────────────────┐   ┌──────────────────────────────────────┐
│ mov    rax, MEM         │   │ I1: mov rax, MEM                     │
│ mov    MEM, rax         │   │ I2: mov rax, MEM | mov MEM, rax      │
│ call   rip              │   │ I3: mov rax, MEM | * | mov MEM, rax  │
│ mov    MEM, rax         │   │ ...                                  │
│ ...                     │   └──────────────────────────────────────┘
└─────────────────────────┘
        FIG. 6A                              FIG. 6B
```

BINARY CODE SIMILARITY DETECTION SYSTEM

CROSS-REFERENCE TO RELATED APPLICATIONS

This application claims priority to U.S. Prov. Pat. Appl. No. 63/028,700, filed May 22, 2020, which is hereby incorporated by reference.

FEDERAL FUNDING

This invention was made with government support under Grant Nos. 1350766, 1618706 and 1717774 awarded by the National Science Foundation (NSF) and Grant No. N66001-18-C-4033 awarded by the Defense Advanced Research Projects Agency (DARPA). The government has certain rights in the invention.

BACKGROUND

Software vulnerabilities are a common attack vector for cyber adversaries. Those software vulnerabilities may be unintentionally distributed to more and more devices by the wealth of open-source software projects, which allow for the open distribution and reuse of computer software. Open-source software projects allow code segments to be copied and pasted to new locations. Unfortunately, vulnerable code may be unknowingly copied from one location and pasted to another. Even when the vulnerability is discovered and patched, there is no guarantee that all occurrences of that vulnerability in all other locations within and across various projects and versions are also patched.

Various efforts are made to identify, define, and catalog the cybersecurity vulnerabilities found in source code. To test if a particular source code includes a known vulnerability, methods exist to compare that particular source code to a library of source code functions having known vulnerabilities (e.g., the Graph-Based Source Code Vulnerability Detection System described in U.S. Publication No. 2021/0279338).

To determine if a device or closed-source application has a known vulnerability, however, it is often not possible to analyze the source code because the source code has been compiled into binary code format and the original source code is not available. Binary code runs on countless computing devices, from desktop computers to smartphones to Internet of Things (IoT) devices. Each computing device may run vulnerable binary code. For example, as many open-source libraries are widely used, the vulnerabilities (e.g., those in OpenSSL and FFmpeg) are also inherited by closed-source applications (in binary code format).

When source code is unavailable, binary code similarity detection may be used to perform vulnerability detection, malware analysis, security patch analysis, and even plagiarism detection. The traditional approach for binary code similarity detection takes two different binary codes as the inputs (e.g., the whole binary, functions, or basic blocks) and computes a measurement of similarity between them. If two binary codes were compiled from the same or similar source code, this binary-binary code similarity approach produces a high similarity score.

To compare binary code from a device or closed-source application to source code, however, requires source-binary code similarity detection, where the code to be analyzed is in the binary format while the one for comparison is in the source code format. A traditional approach is to first compile the source code with a particular compiling configuration and then compare the compiled source code to the target binary code using binary-binary code similarity detection methods. However, such an approach faces two major challenges that prevent them from achieving high accuracy and coverage.

First, there are a large number of different compiling configurations that can be used, including the compiler (e.g., gcc and llvm), the compiler version (e.g., gcc and llvm each have tens to hundreds of versions), parameters (e.g., at least four optimization levels for gcc and llvm), and the target architecture (e.g., x86 and arm). Compiling the source code with either a random or fixed compiling configuration significantly increases the difficulty of code similarity detection because the source code may be compiled with a different compiling configuration than the target binary code.

FIGS. 1A-1D show an example source code 110 and assembly codes 120, 130, and 140 of the source code 110, having been compiled with three different compiling configurations. FIGS. 1B-1C include both the codes and the control flow of the assembly codes 120 and 130. In FIG. 1D, the codes are omitted (due to the large number of codes) and only the control flow is shown. The assembly code 120 of FIG. 1B was compiled using the compiling configuration x86-llvm-3.3-O1. The assembly code 130 of FIG. 1C was compiled using the compiling configuration x86-llvm-3.3-O1. The assembly code 140 of FIG. 1D was compiled using the compiling configuration x64-gcc-4.8.5-O3.

The assembly codes 120 and 130 of FIGS. 1B and 1C are similar because they share the same compiler family (llvm), optimization level (O1), and target architecture (x86), with the only difference being compiler version (version 3.3 for assembly code 120 and version 3.5 for assembly code 130). In contrast, the assembly code 140 of FIG. 1D is drastically different, due to its choice of compiling configuration (gcc version 4.8.5 with O3 for the x64 architecture). In the assembly code 140 of FIG. 1D, both the code size and the control flow differ significantly from the examples in FIGS. 1B and 1C, mainly because of loop related optimization techniques (e.g., tree vectorization and loop unrolling). For the reasons discussed above, binary-binary similarity detection methods that rely on a single, binary level model for similarity analysis have difficulty in fully accounting for the differences that arise solely from the different compiling configurations.

The second problem is there are different degrees of code similarity and prior art methods have difficulty identifying codes that are only syntactically equivalent or similar. The types of syntax similarity include type-1 code similarities (literally same), type-2 code similarities (syntactically equivalent), and type-3 code similarities (syntactically similar).

FIGS. 2A-2D illustrate the varying degrees of code similarity. FIG. 2A shows an example source code 210 with a vulnerability of denial of service (infinite loop) when the attacker controls the inputs to trigger a NULL value of a BIO data structure. FIG. 2B shows an example source code 220, which has a type-1 code similarity (literally same) with the source code 210 of FIG. 2A and includes the same vulnerability. FIG. 2C shows an example source code 230, which has a type-2 code similarity (syntactically equivalent) with the source code 210 of FIG. 2A and also includes the same vulnerability. FIG. 2D shows an example source code 240, which has a type-3 code similarity (syntactically similar) with the source code 210 of FIG. 2A and also includes the same vulnerability.

Existing methods have been shown to work well for the type-1 code similarities, but less desirable for other types, especially type-3 code similarities. Meanwhile, type-3 code similarities are known to have significant importance in various applications. A recent study, for example, found that type-3 syntactically similar code can contribute to 50-60 percent of all vulnerabilities.

Therefore, there is a need improved source-binary code similarity detection, particularly a system and method that more accurately identifies type-2 and type-3 code similarities.

SUMMARY

In order to overcome those drawbacks in the prior art, a binary code similarity detection system is provided. The system compares a target binary code to a source code by comparing the target binary code to a comparing binary generated by compiling the source code. While existing methods generate a comparing binary by compiling the source code using a random or fixed compiling configuration, the disclosed system identifies the compiling configuration of the target binary code and compares the target binary code to a comparing binary generated by compiling the source code using the same compiling configuration as the target binary code.

The compiling configuration of the target binary code may be identified by a neural network trained on a training dataset of binary codes compiled using known configurations, for example a graph attention network trained on attributed function call graphs of binary codes. The target binary code and the comparing binary may be compared using a graph neural network (e.g., a graph triplet loss network) that compares attributed control flow graphs of the of the target binary code and the comparing binary.

The system may include a database of source code functions each having a known vulnerability and determine whether the target binary code includes one of those known vulnerabilities by comparing the target binary code to comparing binaries generated from each of the source code functions in the database.

BRIEF DESCRIPTION OF THE DRAWINGS

The accompanying drawings are incorporated in and constitute a part of this specification. It is to be understood that the drawings illustrate only some examples of the disclosure and other examples or combinations of various examples that are not specifically illustrated in the figures may still fall within the scope of this disclosure. Examples will now be described with additional detail through the use of the drawings.

FIG. 1A shows an example source code.

FIG. 1B shows assembly code (and control flow) of the source code of FIG. 1A compiled using a first compiling configuration.

FIG. 1C shows assembly code (and control flow) of the source code of FIG. 1A compiled using a second compiling configuration.

FIG. 1D shows the control flow of an assembly code of the source code of FIG. 1A compiled using a third compiling configuration.

FIG. 2A shows an example source code with a vulnerability.

FIG. 2B shows an example source code having a type-1 code similarity (literally same) with the source code of FIG. 2A.

FIG. 2C shows an example source code having a type-2 code similarity (syntactically equivalent) with the source code of FIG. 2A.

FIG. 2D shows an example source code having a type-3 code similarity (syntactically equivalent) with the source code of FIG. 2A.

FIG. 4A shows an example source code.

FIG. 4B shows assembly code of the source code of FIG. 4A compiled using a first compiling configuration.

FIG. 4C shows assembly code of the source code of FIG. 4A compiled using a second compiling configuration.

FIG. 4D shows assembly code of the source code of FIG. 4A compiled using a third compiling configuration.

FIG. 6A illustrates normalized instructions of the assembly code of FIG. 4B.

FIG. 6B illustrates extracted instruction-level features of the assembly code of FIG. 4B.

DETAILED DESCRIPTION

Figure 3:
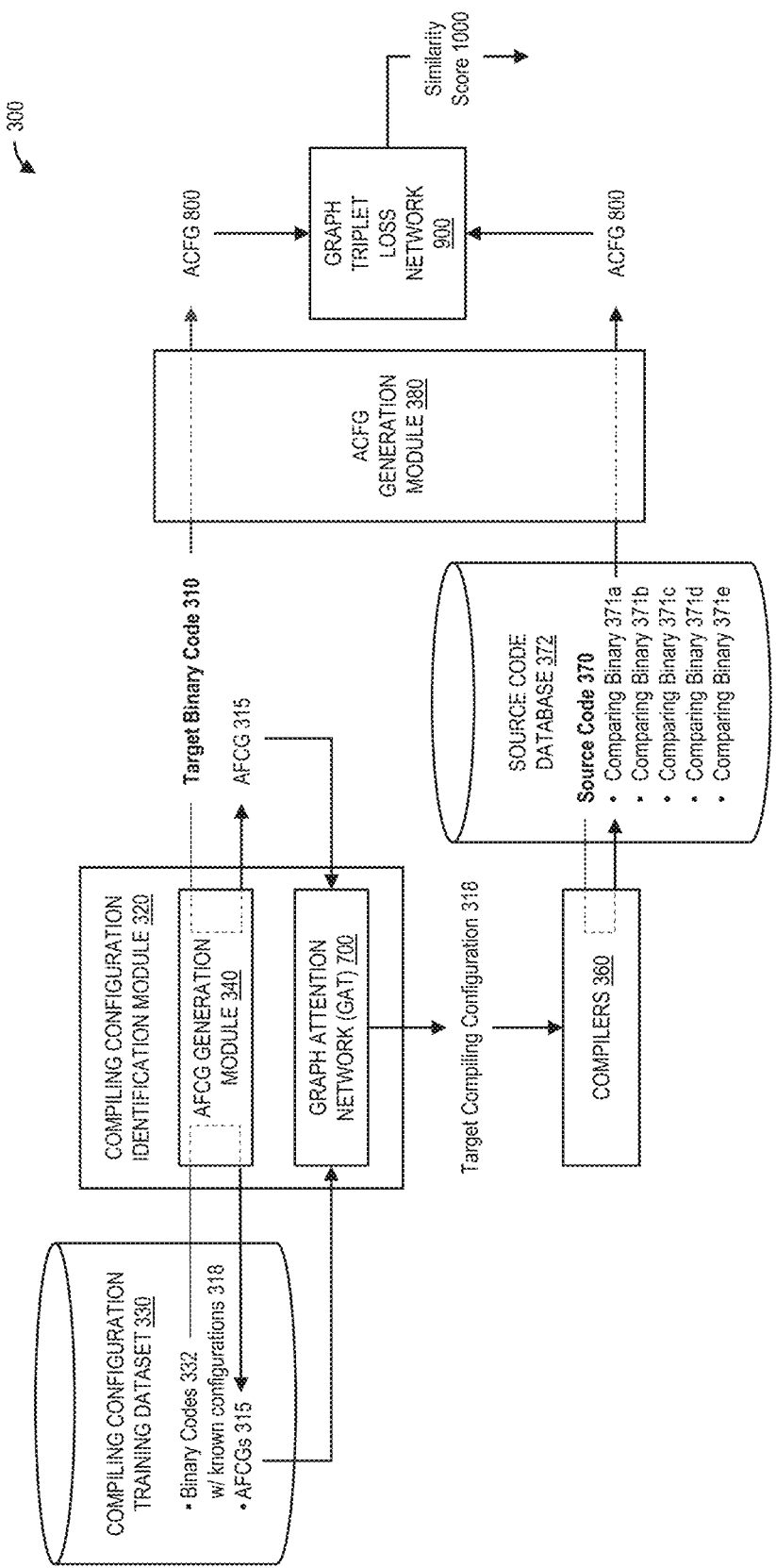
FIG. 3 is a block diagram illustrating a binary code similarity detection system according to an exemplary embodiment.

In describing the illustrative, non-limiting embodiments illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments are described for illustrative purposes, it being understood that the description and claims are not limited to the illustrated embodiments and other embodiments not specifically shown in the drawings may also be within the scope of this disclosure.

FIG. 3 is a high-level diagram illustrating a binary code similarity detection system 300 according to an exemplary embodiment.

The system 300 compares a target binary code 310 and a source code 370. In preferred embodiments, system 300 compares a target binary code 310 to each source code 370 in a database 372 of source code functions with known vulnerabilities (received, for example, from the National Vulnerability Database). The system 300 can then be used to determine if binary code running on a device has any of known vulnerabilities included in the database 372 by comparing the binary code 310 to each source code 370 in the database 372.

To compare the target binary code 310 and the source code 370 in binary format, the source code 370 must first be compiled using a compiling configuration 318 to form a comparing binary 371. However, as described above, the plethora of possible compiling configurations 318 means that there are an equally large number of comparing binaries 371*a*, 371*b*, etc. that can be compiled from the same source code 370, some with vastly different attributes relied upon to determine similarity.

To overcome that drawback, the system 300 first identifies the likely compiling configuration 318 of the of the target binary code 310 (referred to herein as the "target compiling configuration" 318). Then, the comparing binary 371 generated by compiling the source code 370 using the target compiling configuration 318 is identified. Finally, the system 300 compares the target binary code 310 to the comparing binary 371 generated by compiling the source code 370 using the target compiling configuration 318.

To identify the target compiling configuration 318, the system 300 includes a compiling configuration identification module 320 and a compiling configuration training dataset 330. The training dataset 330 includes binary codes 332 that were compiled using known compiling configurations 318. The configuration identification module 320 includes an attributed function call graph (AFCG) generation module 340 and a graph attention network (GAT) 700. The attributed function call graph (AFCG) generation module 340, which performs a process 500 described in detail below with reference to FIG. 5, generates attributed function call graphs (AFCGs) 315 of the target binary code 310 and the binary codes 332 in the training dataset 330. The graph attention network (GAT) 700, which is described in detail below with reference to FIG. 7, is trained on the attributed function call graphs (AFCGs) 315 and the known compiling configurations 318 in the training dataset 330 and is therefore configured to identify the likely compiling configuration 318 of the target binary code 310.

As mentioned above, a comparing binary 371 (generated by compiling the source code 370 using the target compiling configuration 318) is identified. In some embodiments, the system 300 includes compilers 360 that generate the comparing binary 371 by compiling the source code 370 using the target compiling configuration 318 identified by the compiling configuration identification module 320. However, in preferred embodiments, the source code 370 is stored in a source code database 372 that pre-stores a number of comparing binaries 371*a*, 371*b*, etc., each compiled using a unique compiling configuration 318. In those preferred embodiments, the system 300 can simply select the comparing binary 371 that was generated by compiling the source code 370 using the target compiling configuration 318. Because each of the comparing binaries 371 is generated by compiling one of the source codes 370 using known compiling configurations 318, in some embodiments the pre-stored comparing binaries 371 in the source code database 372 may also serve as the dataset 330 of binary codes 332 with known compiling configurations 318 used to train the graph attention network (GAT) 700 as described above.

To identify any similarity between the target binary code 310 and the identified comparing binary 371 of the source code 370, the binary code similarity detection system 300 also includes an attributed control flow graph (ACFG) generation module 380 and a graph triplet loss network (GTN) 900. The ACFG generation module 380, which is described in detail below with reference to FIG. 8, generates attributed control flow graphs (ACFGs) 800 of the target binary code 310 and the comparing binary 371. The graph triplet loss network (GTN) 900, which is described in detail below with reference to FIG. 9, generates a similarity score 1000 indicative of the similarity between the target binary code 310 and the comparing binary 371.

By using a comparing binary 371 compiled using the same compiling configuration 318 as the target binary code 310, the binary code similarity detection system 300 is able to identify code similarities with higher accuracy than existing methods. The system 300 is particularly well suited to identify the type-2 and type-3 code similarities that are by definition more difficult to identify than type-1 code similarities. The source code database 372 can be used to store a large database of source code functions with known vulnerabilities (received, for example, from the National Vulnerability Database), each with a number of comparing binaries 371 compiled using unique compiling configurations 318. Furthermore, because the binary code similarity detection system 300 is scalable, the system 300 can be used to compare target binary codes 310 to the database of vulnerabilities, accurately and efficiently determining if binary code includes a known threat.

FIGS. 4A-4D illustrate the effect of different compiling configurations 318. FIG. 4A shows an example source code 410: specifically, a fragment of the source code CVE-2015-1792. FIG. 4B shows an assembly code 420 produced by compiling the example source code 410 with the compiling configuration GCC-4.8.4-O0. FIG. 4C shows an assembly code 430 produced by compiling the example source code 410 with the compiling configuration GCC-4.8.4-O2. FIG. 4D shows an assembly code 440 produced by compiling the example source code 410 with the compiling configuration Clang-5.0-O0.

Figure 5:
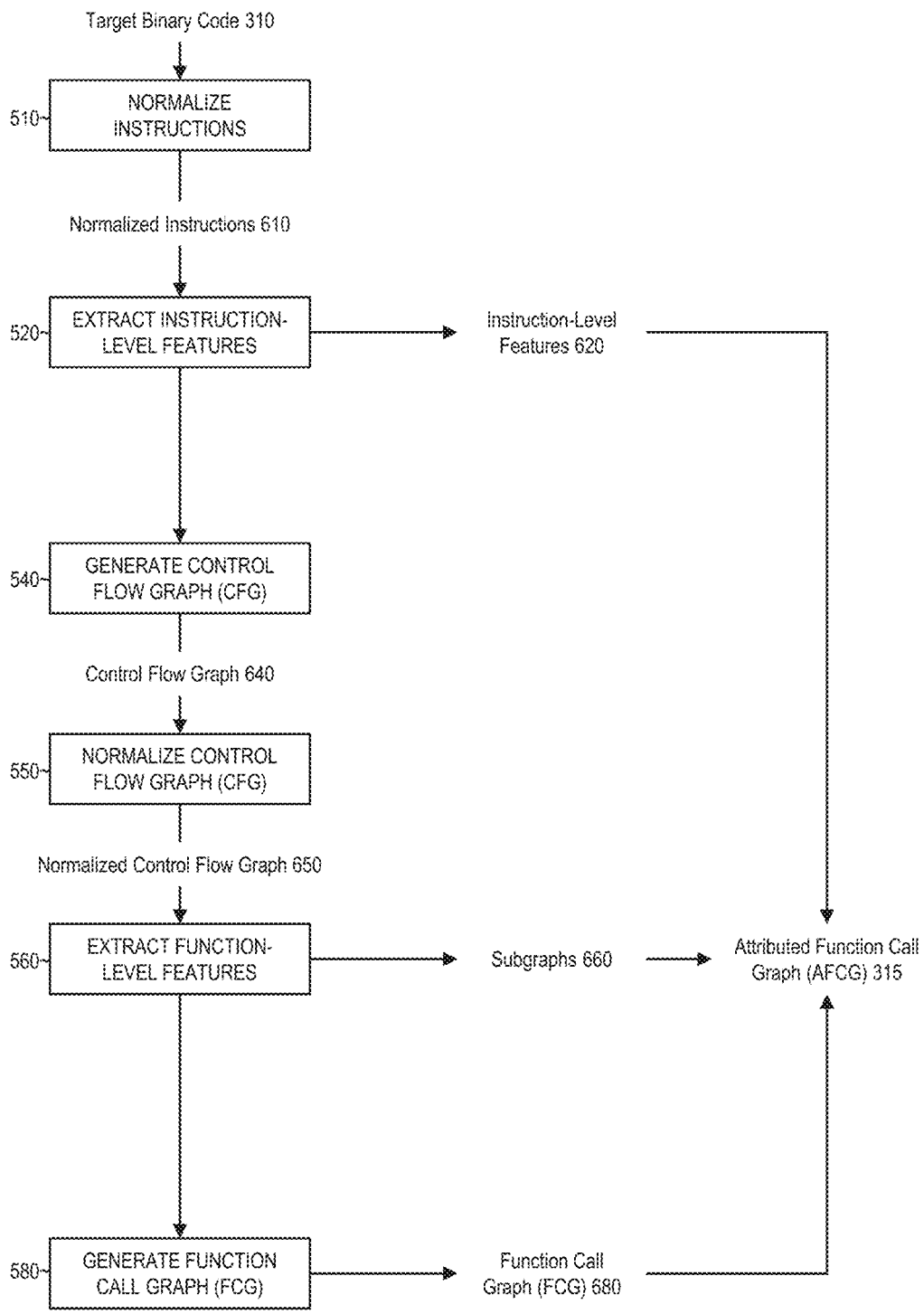
FIG. 5 is a flowchart illustrating an attributed function call graph (AFCG) generation process according to an exemplary embodiment.

FIG. 5 is a flowchart illustrating an attributed function call graph (AFCG) generation process 500, performed by the AFCG generation module 340, to generate an attributed function call graph (AFCG) 315 according to an exemplary embodiment.

To identify the compiling configuration of the target binary code 310, the system 300 performs the AFCG generation process 500 to identify features of the target binary code 310 that are indicative of the difference between various compiling configurations. As described in detail below, the AFCG generation process 500 may be used to identify features at three levels—the instruction level, the function level, and the binary level—that can be used in combination to identify the compiling configuration of the target binary code 310. The system 300 uses those extracted features to construct a new representation for the target binary code 310; specifically, an attributed function call graph (AFCG) 315.

To identify the differences in the instruction-level features that are indicative of different approaches, the system 300 takes the instruction patterns (known as "idioms") of the target binary code 310 as the instruction features for compiling parameter identification. To do so, the system 300 normalizes the instructions of the target binary code 310 in step 510 (thereby generating normalized instructions 610) and extracts instruction-level features 620 in step 520. The system 300 normalizes the instructions of the target binary code 310 by keeping the essential operation code (opcode) and normalizing the operands to a general shape. In particular, the system 300 normalizes the register, memory address, and other user-controlled operands (e.g., constant and function names). FIG. 6A illustrates normalized instructions 610 of the assembly code 420 shown in FIG. 4B.

To extract the instruction-level features 620, the system 300 extracts the unique instruction patterns and their combinations. FIG. 6B illustrates the extracted instruction-level features 620 of the assembly code 420 shown in FIG. 4B. To improve the representativeness of the extracted instruction-level features 620, the system 300 may add a wildcard to represent any instruction. For example, the extracted instruction-level features 620 are shown in FIG. 6B with "|" as the instruction split symbol.

Instruction-level features 620 are used in the AFCG generation process 500 because different compilers and configurations usually have different approaches in terms of instruction usage, register usage, instruction ordering, etc. Using tbio=BIO_pop (f) function in line 3 of the source code 310 of FIG. 3A as an example, the compiling configuration GCC-4.8.4-O0 would result in the use of the accumulator register eax and two mov instructions before calling the BIO_pop function. On the other hand, the compiling configuration GCC-4.8.4-O2 would result in the use of the base address register ebx and just one mov instruction.

The AFCG generation process 500 may also be used to identify function-level features from one or more functions in the target binary code 310. To do so, the system 300 may generate a control flow graph (CFG) 640 of one or more functions in the target binary code 310 in step 540. A control flow graph (CFG) 640 is a representation, using graph notation, of all paths that might be traversed through a program during its execution. A control flow graph (CFG) 640 is extracted from a function.

Just as different compilation processes can affect the instruction patterns as described above, different compiling configurations affect how the basic blocks form in the control flow graphs 640 of functions found in the target binary code 310. For instance, even though they are both compiled version of the example source code 410 shown in FIG. 4A, the control flow graph 640 of the assembly code 420 shown in FIG. 4B includes only one node while the control flow graph 640 of the assembly code 430 shown in FIG. 4C includes two nodes.

Figure 6C:
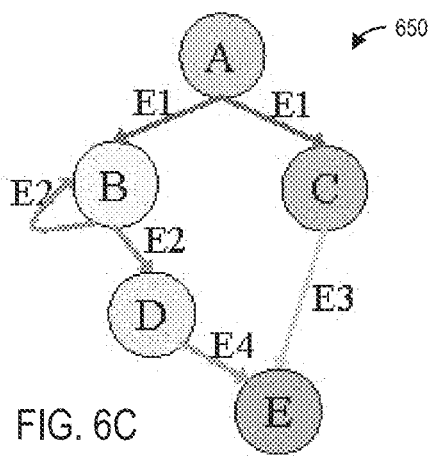
FIG. 6C illustrates a normalized control flow graph (CFG) of the example function in the assembly code of FIG. 4B.

The system 300 normalizes the control flow graph (CFG) 640 in step 550 (thereby generating a normalized control flow graph (CFG) 650) and extracts function-level features 660 in step 560. To normalize the CFG 640, the system 300 assigns a type value to each node and edge. As each node is a basic block, its type value is decided by the category of contained instructions (e.g., string, branch, and logic operation). The system 300 classifies the instructions into categories (e.g., 14 categories) and may use an integer to represent the type (e.g., a 14-bit integer where each bit denotes whether the specific instruction category exists or not). For the edges initiated by branch operations, the system 300 labels them based on the different types of branch operations (e.g., jnz, jge). FIG. 6C illustrates a normalized control flow graph (CFG) 650 of the example function in the assembly code 420 shown in FIG. 4B.

Figure 6D:
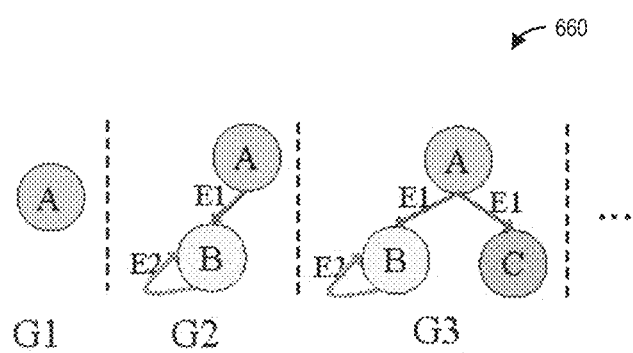
FIG. 6D illustrates subgraphs extracted from the normalized CFG of FIG. 6C.

The system 300 extracts function-level features in step 560 by extracting different subgraphs 660 from the normalized CFG 650 as features. A subgraph 660 is a subset of the connected nodes of the normalized CFG 650 with the corresponding edges. FIG. 6D illustrates subgraphs 660 (individually identified as subgraphs G1, G2, and G3) extracted from the normalized CFG 650 shown in FIG. 6C. Mining all of the possible subgraphs 660 is not scalable because it is a nondeterminative polynomial problem. Meanwhile, the goal is to mine useful subgraph patterns that are indicative of the compiling configuration. Therefore, the system 300 may mine only the subgraphs 660 having at least a threshold number of nodes.

Figure 6E:
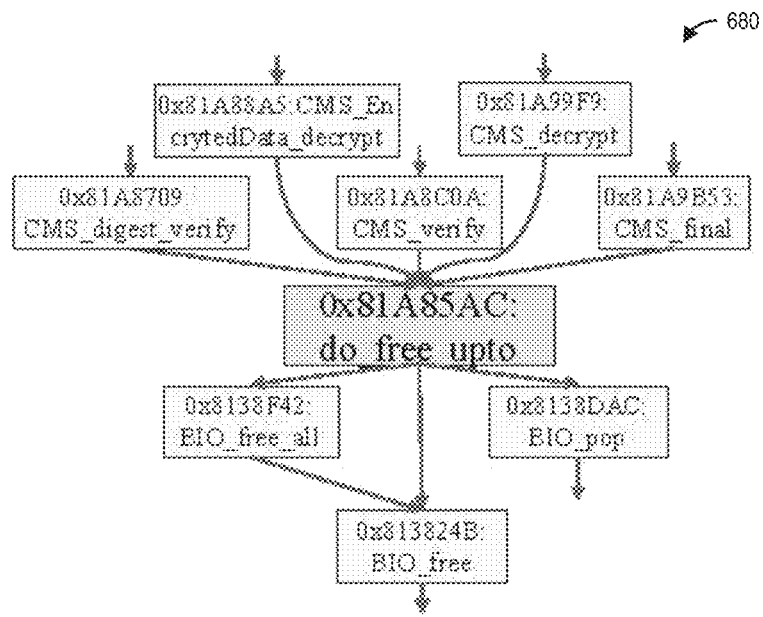
FIG. 6E illustrates a function call graph (FCG) of the example function in the assembly code of FIG. 4B.

The AFCG generation process 500 may also be used to identify binary-level features of the target binary code 310. To do so, the system 300 may generate a function call graph (FCG) 680 of the target binary code 310 in step 580. In a function call graph 680, a node denotes a function and an edge denotes a call relationship of the function. Accordingly, the function call graph 680 is able to capture the difference from function changes in terms of number, call relationship, etc. and provides an effective representation to show the changes brought by different compiling configurations. FIG. 6E illustrates a function call graph 680 of the example function in the assembly code 420 shown in FIG. 4B.

The AFCG generation process 500 identifies binary-level features because compilers will often optimize the program from the binary level to achieve the optimal global performance. Many compiler optimizations work on the binary level, such as function inlining, interprocedural dead code elimination, interprocedural constant propagation, and procedure reordering. Taking the function inlining (usually enabled in O2 and O3) as an example, it heuristically selects the functions worth inlining. From the binary level, one can clearly identify the difference between functions by looking at a feature like the call relationships.

To combine the features extracted from the three levels of the target binary code 310, the system 300 generates an attributed function call graph (AFCG) 315 to represent the target binary code 310. To generate an attributed function call graph (AFCG) 315, the system 300 uses the function call graph (FCG) 680 as the core structure and adds attributes; specifically, the instruction-level features 620 and the function-level features 660. The system attributes each node (in this case, each function) as an initial feature vector.

To identify the compiling configuration of target binary codes 310, the system 300 generates and stores a training dataset 330 of binary codes 332 with known compiling configurations 318. Because the system 300 extracts both instruction-level features 620 and a CFG 640 from each binary code 332 in the training dataset 330, the resulting number of features may be massive. To solve that problem, the system 300 may employ a feature selection technique. For example, the system 300 may employ a mutual information method to select a reasonable number of features that are important to classify different classes, which can be quantified by the mutual information between the feature and class. For instance, the system 300 may select the top-k highly ranked features. To avoid feature bias, the system 300 may also normalize the feature value, which is initialized as a frequency, for example to a number on a scale between 0 and 1. More specifically, the system 300 may divide each feature frequency to the maximum frequency value among all the binaries. Accordingly, the system 300 can build an AFCG 315 with a number of attributes that is computationally manageable by the system 300.

Having generated an AFCG 315 for the target binary code 310 and the binary codes 332 in the training set 330, the system 300 identifies the target compiling configuration 318 using a graph neural network (GNN) trained on the training dataset 330, which is able to learn an embedding for a graph and further tune the model based on the downstream task (i.e., multi-graph classification). More specifically, the system 300 may use a specific type of GNN, known as a graph attention network (GAT) 700.

In compiling configuration identification, the neighbor nodes or edges on the AFCG 315 have different impacts on the final embedding. For example, when generating the embedding of a node in the AFCG 315, the function with critical compilation features that can be used to identify the compiling configuration should be more representative, and thus should be weighted more for embedding generation. To satisfy this requirement, the graph attention network (GAT) 700 includes an attention mechanism that identifies the important nodes and edges and assigns larger weights to the more important ones and smaller weights to the less important ones.

Figure 7B:
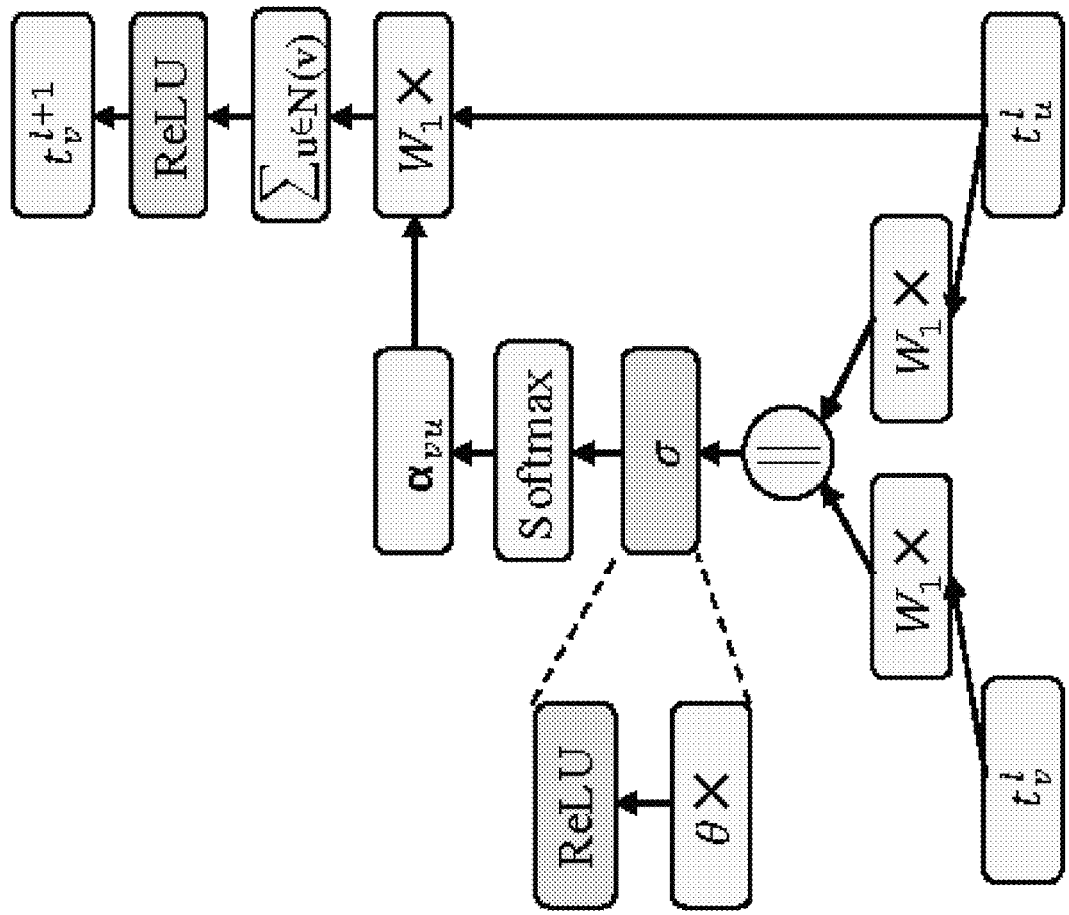
FIG. 7B illustrates a node embedding computation for a node of the GAT of FIG. 7A.
Figure 7A:
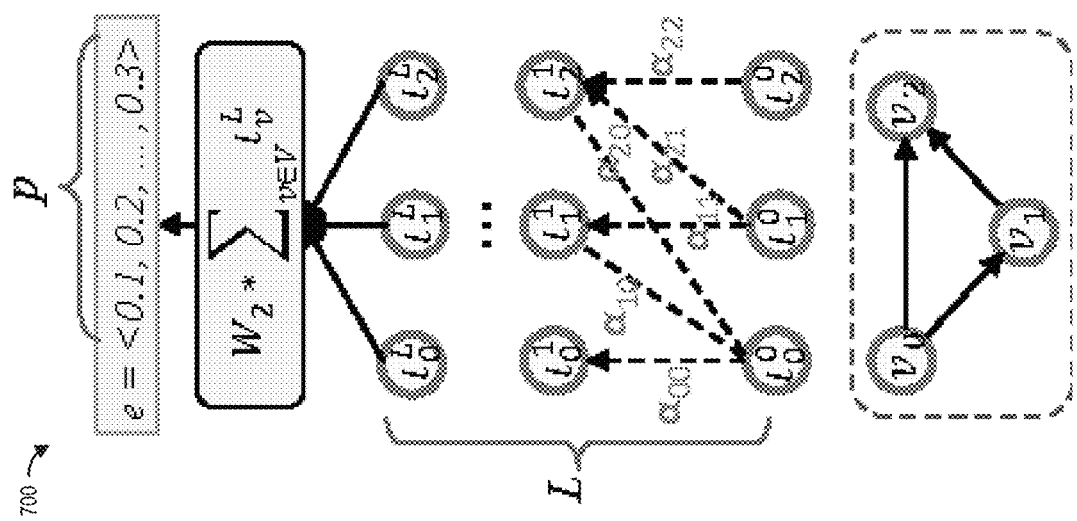
FIG. 7A illustrates a graph attention network (GAT) according to an exemplary embodiment.

FIG. 7A illustrates the flow of the graph attention network (GAT) 700 according to an exemplary embodiment. As shown in FIG. 7A, the GAT 700 takes a graph g as input, iteratively computes the node embedding by attention on its neighbor nodes, and outputs a learned embedding e for the whole graph. The GAT 700 is stacked with L layers. Each layer (except the input layer) takes the node embeddings from the previous layer as input and outputs the computed node embeddings from this layer.

As mentioned above, the GAT 700 includes an attention mechanism. FIG. 7B illustrates the node embedding computation for node v for the (l+1)-th layer according to an exemplary embodiment. For every neighbor node of v (including itself), the GAT 700 first learns an attention coefficient, and later computes the embedding for node v. In FIG. 7B, tl is used to represent the embedding for node v at the l-th layer, which has d-dimension, and tl+1 is used to represent the embedding at the (l+1)-th layer, which has d'-dimension. For every edge connecting u and v, $\alpha_{vu}$ is used to denote the attention coefficient, which is computed from a single-layer feedforward neural network. The formalized equation is shown as follows:

$$\alpha_{vu} = \text{softmax } \sigma(\theta([W_1 t_v^l \| W_1 t_u^l]))$$

where softmax(•) represents the standard softmax function that normalizes the input vector into a probability distribution, a represents the activation function (in this example, the ReLU function), θ is a weight vector with 2d' dimensions, $W_1$ is a shared weight matrix with d'×d dimensions and II is the concatenation operation.

The GAT 700 may also perform a graph convolution. After obtaining the attention coefficients from the neighbors of node v, the GAT 700 will perform the graph convolution operation to accumulate the neighbor embedding. The formalized equation is shown as follows:

$$t_v^{l+1} = \sigma\left(\sum_{u \in N(v)} \alpha_{vu} W_1 t_u^l\right)$$

For each edge connecting u and v, the accumulated value of the edge will be the multiplication of the attention coefficient $\alpha_{vu}$, the weight matrix $W_1$, and the embedding $t_u^l$ of node u. Followed by another activation function, the GAT 700 will identify the node embedding $t_v^{l+1}$ with d' dimension.

At the output layer, all of the node embeddings in this graph are accumulated to one embedding as follows:

$$e = W_2\left(\sum_{v \in V} t_v^L\right)$$

where $W_2$ is a weight matrix with dimension p×p and p is equal to d' of the previous layer, and e is a p dimension vector. The system 300 uses the cross-entropy loss function to compute the loss value between graph embedding and the provenance class. Later, the system 300 backward propagates the loss value to the previous layers and optimizes the learned model with Adam optimizer aiming at minimizing the loss value.

Conventional binary code similarity detection methods first disassemble the binary code to assembly code, in which the statement is combined by operation code (opcode) and operand. Further, the control flow operations (e.g., branch statement) split the assembly code into multiple basic blocks, where either all the statements inside one basic block will execute together, or none of them will execute. Taking each basic block as a node and the control flow relationship as an edge, prior art methods generate a control flow graph (CFG). As control flow graphs maintain code structures, they are an essential representation for code analysis. However, only using the control flow graph without the specific assembly code ignores the syntax features of the binary code.

To overcome this drawback, the system 300 employs an attributed control flow graph (ACFG) 800 by attributing each node as a syntax feature vector.

Figure 8:
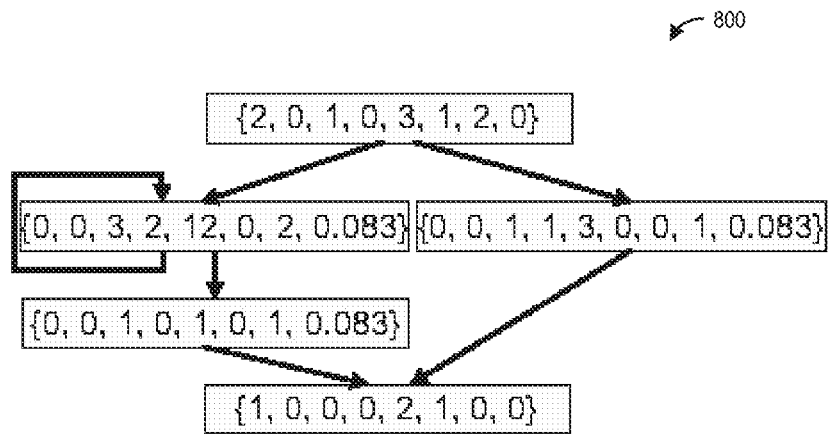
FIG. 8 shows an attributed control flow graph (ACFG) for the source code of FIG. 1A as compiled using a fourth compiling configuration according to an exemplary embodiment.

FIG. 8 shows the attributed control flow graph (ACFG) 800 for the source code 110 as compiled using the compiling configuration (x86,gcc,4.8.4,O0) according to an exemplary embodiment.

An attributed control flow graph (ACFG) 800 is an efficient representation for binary code, particularly because the attributed control flow graph (ACFG) 800 may include features extracted from both the basic block level (e.g., the number of numeric constants, the string constants, the transfer instructions, the calls, the instructions, and the arithmetic instruction) and from the CFG level (e.g., the number of children and the betweenness centrality, which measures the node importance based on the passed shortest paths).

Once attributed control flow graphs (ACFGs) 800 are constructed, the similarity of two binary codes (i.e., the target binary code 310 and the compiling binary 371) is transformed into the similarity of two attributed control flow graphs (ACFGs) 800. Ideally, the system 300 is configured to compare the target code 310 to an entire library of known vulnerabilities, stored in the source code database 392, each with multiple compiling binaries 371 so that the target source code can be compared to compiling the compiling binaries 371 with the same compiling configuration 318 as the target source code 310. In order to calculate that many graph similarities, a good algorithm needs to be not only accurate, but also scalable. For example, there are 6,441 functions in the OpenSSL binary (version 1.0.1f) if compiled with (x86, gcc, 4.8.4,O0). If more than 100 vulnerable functions are used for comparison, that would necessitate comparing millions of pairs of attributed control flow graphs (ACFGs) 800 for only one binary. To provide a scalable binary code similarity detection, the system 300 leverages the recent advances in graph neural network (GNN) to learn a representative embedding for each attributed graph, which can then be used for accurate similarity computation.

Figure 9:
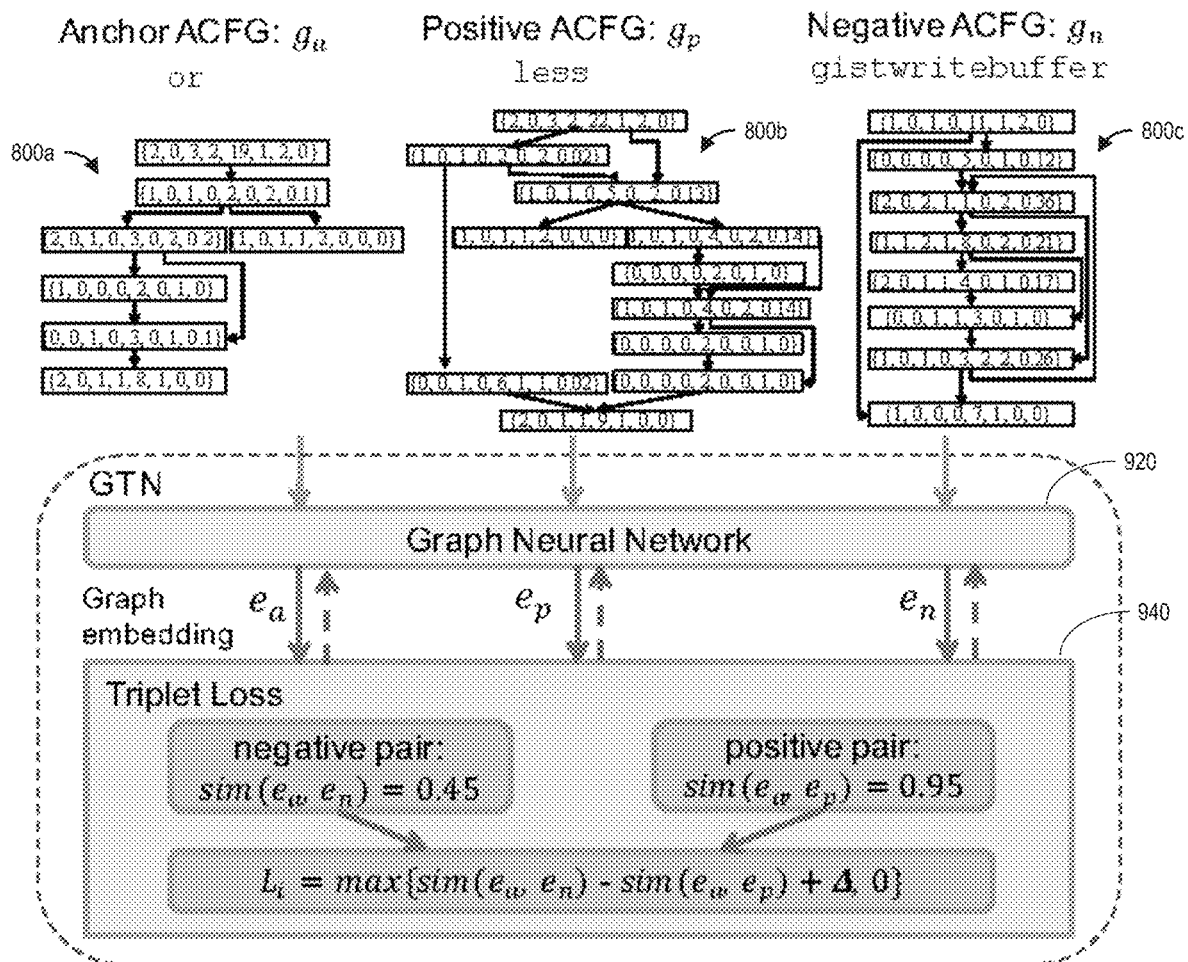
FIG. 9 is a diagram illustrating a graph triplet loss network (GTN) according to an exemplary embodiment.

FIG. 9 is a diagram illustrating a graph triplet loss network (GTN) 900, including a graph neural network (GNN) 920 and triplet loss 940, according to an exemplary embodiment.

To illustrate the use of the attributed control flow graphs (ACFGs) 800 and the graph embeddings, FIG. 9 also includes an ACFG 800a for the function or compiled with the compiling configuration (x86, llvm, 3.3, O2), an ACFG

800b for the function less compiled with the compiling configuration (x86, llvm, 5.0, O2), and an ACFG 800c for the function gistwritebuffer compiled with the compiling configuration (x86, llvm, 3.3, O2). The functions or and less share type-3 code similarity and the function gistwritebuffer is a different function. In the example shown in FIG. 9, the ACFGs 800 are the inputs to a GNN 920, which in turn produces the graph embeddings for each ACFG 800. The outputs of the GNN 920 are three graph embeddings (e.g., ea, ep, and en).

Using the graph triplet loss network (GTN) 900, the system 300 is able to accurately capture the subtle difference among these ACFGs 800 and functions. Similarity may be measured by the cosine similarity, which has been shown to be effective for the embeddings in high dimensional space. For any two vectors, i.e., $\vec{A}$ and $\vec{B}$, it is formally defined as:

$$sim(\vec{A}, \vec{B}) = \frac{\vec{A} \cdot \vec{B}}{\|\vec{A}\| \|\vec{B}\|} = \frac{\sum_{i=1}^{n} A_i B_i}{\sqrt{\sum_{i=1}^{n} A_i^2} \sqrt{\sum_{i=1}^{n} B_i^2}}$$

The similarity score 1000 is in the range [−1, 1], where the higher the value is, the more similar the embeddings are. From the examples shown in FIG. 9, one can see that the generated embeddings of or and less show a high cosine similarity score (0.95) while or and gistwritebuffer show a low score (0.45). Because the GNN model 920 is not sufficient by itself to model the similarity, the system 300 also includes a proper loss function to supervise the learning process of the GNN 920. In the context of code similarity computation, the loss function should be able to generate loss values based on the similarity (i.e., the loss value should be small if two similar codes have similar embedding) and the learned model must be able to detect the subtle difference in codes with different code similarity types. In other words, the model should be able to learn that type-1 is more similar than type-2 and type-3, type-2 more similar than type-3, and type-3 more similar than completely different code. Therefore, the similarity ranking can be represented as type-1>type-2>type-3>different.

To address both challenges, the system 300 builds a graph triplet-loss network (GTN) 900 that relies on the triplet loss 940 to supervise the learning of the GNN model 920. FIG. 9 shows the workflow of the GTN model 900. The input to the GTN 900 is a triplet of ACFGs 800 (binary functions), which consists of the anchor graph (ga), positive graph (gp), and negative graph (gn), i.e., {ga, gp, gn}. The GTN 900 computes the ranking of similarity where ga and gp are more similar than ga and gn. At the core of graph triplet-loss network 940 is the triplet loss computation for the similarity of two pairs; specifically, the positive pair {ea, ep} and the negative pair {ea, en}. Formally, the loss value $\mathcal{L}$ for the i-th triplet is defined as:

$$\mathcal{L}_i = \max\{sim(e_a^i, e_n^i) - sum(e_a^i, e_p^i) + \Delta, 0\}$$

which is greater than or equal to 0. Here, Δ denotes the margin to enhance the distance between positive and negative pairs so that the model can put the similar pair closer and the different pair further in the high dimensional space. For the example in FIG. 9, the loss value would be max {Δ−0.5, 0}. The margin value Δ plays an important role on the accuracy of similarity computation. A larger margin value Δ can better stretch the distance between positive and negative samples, but requires more training time to reach a smaller loss value, while a smaller margin value Δ can reduce the training time at the expense of accuracy.

As the loss value is back propagated to the GNN model 920, the system 300 may utilize an optimizer (e.g., gradient optimization) to tune the trainable parameters, thereby minimizing the loss value. Formally, for the training triplet set $\mathcal{T}$, the GNN model 920 is tuned based on:

$$\min_{W_1^1,\ldots,W_1^l,W_2,\alpha} \sum_{i}^{|\mathcal{T}|} \mathcal{L}_i$$

As a result, the GNN model 920 is supervised to generate representative embeddings for the purpose of similarity ranking. To this end, the GTN model 920 is end-to-end trainable. Finally, the triplet loss 940 provides an additional benefit in that the similarity relationship can be transitive. That is, if the triplets {a, b, c} and {a, c, d} exist, that means sim(a, b)>sim(a, c) and sim(a, c)>sim(a, d), then sim(a, b)>sim(a, d), which means the triplet {a,b,d} inherently exists. Exploiting the transitivity among a large set of triplets, the system 300 can learn a more accurate model to map a broader similarity space, which enables highly similar code to be ranked higher at the inference stage.

Figure 10:
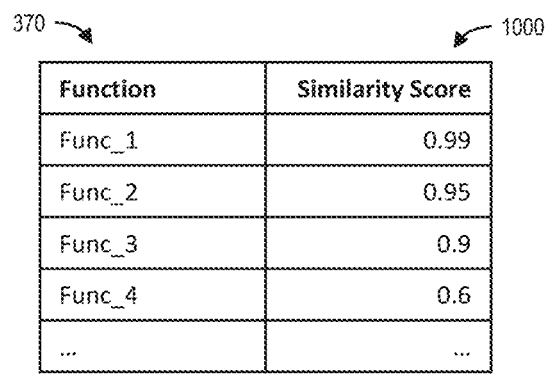
FIG. 10 illustrates example similarity scores 1000 according to an exemplary embodiment.

FIG. 10 illustrates example similarity scores 1000 according to an exemplary embodiment.

As shown in FIG. 10, the system 300 can compare the target binary code 310 to a library of source code function 370 stored in the source code database 372, determine a similarity score 1000 for each source code function 370, and rank the source code functions 370 by their similarity scores 1000. Therefore, in the embodiments where the source code database 372 is a library of source code functions 370 having known vulnerabilities, the system 300 can be used to detect whether the target binary code 310 has a similarity score 1000 that indicates that the target binary code 310 is similar to one or more of source code functions 370 (and is therefore likely to include the known vulnerability or vulnerabilities).

As used herein, the term "binary code" may refer to any machine language instructions, in a low-level programming language, used to directly control a computer. Binary code may include, for example, machine code, assembly language, object code, microcode, bytecode, etc. By contrast, the term "source code" may refer to any collection of code written using a human-readable programming language. The source code may then be transformed into binary code by an assembler or compiler using compiling configuration as described above.

Referring back to FIG. 3, the binary code similarity detection system 300 may be realized using any hardware computing device (e.g., a server, a personal computer, etc.). The source code database 372 and the compiling configuration training dataset 330 may be stored on any non-transitory computer readable storage media internal to the hardware computing device or externally accessible to the hardware computing device via a wired, wireless, or network connection. The source code database 372 and the compiling configuration training dataset 330 may be separate or, as mentioned above, the comparing binaries 371 in the source code database 372 may also serve as the training dataset 330. The compiling configuration module 320, the compilers 360, the ACFG generation module 380, and the triplet loss network 900 may be realized by the hardware computing device executing software instructions stored on non-transitory computer readable storage media.

Because the system 300 compares target binary codes 310 to comparing binaries 371 that were compiled using the same compiling configuration 318 as the target binary codes 310 (rather than using a random or fixed compiling configuration 318, as is done using existing methods), the system 300 is able to identify code similarities with higher accuracy than existing methods. In particular, the system 300 is well suited to identify the type-2 and type-3 code similarities that are by definition more difficult to identify than type-1 code similarities.

The foregoing description and drawings should be considered as illustrative only of the principles of the disclosure, which may be configured in a variety of shapes and sizes and is not intended to be limited by the embodiment herein described. Numerous applications of the disclosure will readily occur to those skilled in the art. Therefore, it is not desired to limit the disclosure to the specific examples disclosed or the exact construction and operation shown and described. Rather, all suitable modifications and equivalents may be resorted to, falling within the scope of the disclosure.

What is claimed is:

1. A method for comparing a source code and a target binary code, wherein the source code cannot be directly compared to the target binary code, the method comprising:
    identifying a target compiling configuration of the target binary code, the target compiling configuration indicating the compilation configuration for the target binary code, wherein identifying the target compiling configuration comprises:
        generating an attributed function call graph of the target binary code and each of the binary codes in a training dataset, where the attributed function call graph represents a calling relationship between functions in the target binary code and the binary codes in the training dataset;
        training a graph attention network on the attributed function call graph of the binary codes in the training dataset; and
        identifying the target compiling configuration, by the graph attention network, based on the attributed function call graph of the target binary code;
    generating a comparing binary for the source code, the comparing binary compiled from the source code using the target compiling configuration; and
    comparing the target binary code to the generated comparing binary to determine a similarity between the source code and the target binary code.

2. The method of claim 1, wherein the target compiling configuration for the target binary code is identified by a neural network using both structural and syntax information trained on the training dataset of binary codes compiled using known compiling configurations.

3. The method of claim 2, wherein the neural network is the graph attention network, which leverages the attention mechanism to generate more accurate embedding.

4. The method of claim 1, wherein the target binary code includes one or more functions, the one or more functions include instructions, and the attributed function call graph comprises a function call graph generated based on the target binary code, the function call graph having attributes that include instruction-level idiom features extracted from the instructions of the target binary code and instruction-level graphlet features extracted from the control flow graphs of the target binary code.

5. The method of claim 1, wherein the comparing binary generated by compiling the source code using the target compiling configuration is identified by:
    storing a plurality of comparing binaries, each of the plurality of comparing binaries comprising the source code compiled using one a plurality of compiling configuration; and
    selecting, from the plurality of stored comparing binaries, the comparing binary generated by compiling the source code using the target compiling configuration.

6. The method of claim 1, further comprising comparing target binary code and the comparing binary comprising:
    generating attributed control flow graphs of the target binary code and the comparing binary;
    using a graph neural network to generate embedding for the target binary code or the comparing binary, the embedding can be used to compute the similarity score indicative of the similarity between the attributed control flow graph of the target binary code and the attributed control flow graph of the comparing binary.

7. The method of claim 6, wherein the graph neural network is a graph triplet loss network that relies on triplet loss to supervise the learning of the graph neural network model.

8. The method of claim 1, further comprising:
    storing a plurality of source codes each having a known vulnerability; and
    determining whether the target binary code is likely to have any of the known vulnerabilities by comparing the target binary code to comparing binaries generated from each of the plurality of source codes using the target compiling configuration.

9. The system of claim 1, wherein the compiling configuration identification module comprises a neural network trained on the training dataset of binary codes compiled using known configurations.

10. The system of claim 9, wherein the neural network is the graph attention network.

11. The method of claim 1, further comprising determining vulnerability of the target binary code based on the determined similarity between the source code and the target binary code.

12. A system for comparing a source code and a target binary code compiled using a target compiling configuration, wherein the source code cannot be directly compared to the target binary code, the system comprising:
    a hardware computing device;
    a compiling configuration identification module that identifies the target compiling configuration, the target compiling configuration indicating the compilation configuration for the target binary code, wherein the compiling configuration identification module identifies the target compiling configuration by:
        generating an attributed function call graph of the target binary code and each of the binary codes in a training dataset;
        training a graph attention network on the attributed function call graph of the binary codes in the training dataset; and
        identifying the target compiling configuration, by the graph attention network, based on the attributed function call graph of the target binary code;
    non-transitory computer readable storage media internal to the hardware computing device or in communication with the hardware computing device, the non-transitory computer readable storage media configured to store a comparing binary generated by compiling the source code using the target compiling configuration; and
    a graph neural network configured to compare the target binary code and the generated comparing binary.

13. The system of claim 12, wherein the target binary code includes one or more functions, the one or more functions include instructions, and the attributed function call graph comprises a function call graph generated based on the target binary code, the function call graph having attributes that include instruction-level idiom features extracted from the instructions of the target binary code and instruction-level graphlet features extracted from the control flow graphs of the target binary code.

14. The system of claim 12, wherein the system includes various compilers matching with the target compilation configurations that can generate the comparing binary by compiling the source code using the target compiling configuration.

15. The system of claim 12, wherein the system:
   stores a plurality of comparing binaries, each of the plurality of comparing binaries comprising the source code compiled using one a plurality of compiling configuration; and
   selects, from the plurality of stored comparing binaries, the comparing binary generated by compiling the source code using the target compiling configuration.

16. The system of claim 12, wherein the graph neural network compares the target binary code and the comparing binary by:
   generating attributed control flow graphs of the target binary code and the comparing binary; and
   using a graph neural network to generate embedding for the target binary code or the comparing binary, the embedding used to compute the similarity score indicative of the similarity between the attributed control flow graph of the target binary code and the attributed control flow graph of the comparing binary.

17. The system of claim 16, wherein the graph neural network is a graph triplet loss network that relies on triplet loss to supervise the learning of the graph neural network model.

18. The system of claim 17, further comprising:
   a source code database comprising a plurality of source codes each having a known vulnerability,
   wherein the system determines whether the target binary code is likely to have any of the known vulnerabilities by comparing the target binary code to comparing binaries generated from each of the plurality of source codes using the target compiling configuration.

* * * * *